3,641,132
PROCESS FOR OBTAINING NITRO BENZOPHENONES

Johann G. D. Schulz and Richard Seekircher, Pittsburgh, Pa., assignors to Gulf Research & Development Company, Pittsburgh, Pa.
No Drawing. Filed Jan. 23, 1969, Ser. No. 793,597
Int. Cl. C07c *79/36, 79/46*
U.S. Cl. 260—517　　　　　　　　　　　　　　8 Claims

ABSTRACT OF THE DISCLOSURE

A process for preparing nitro benzophenones which involves adding nitric acid to a diarylalkane and maintaining the resulting mixture at the reaction temperature for a time sufficient to convert the diarylalkane to the corresponding nitro benzophenone.

---

This invention relates to a process for converting a 1,1-diarylalkane to a nitrobenzophenone, particularly to a process wherein the conversion thereof is effected with nitric acid.

The diarylalkane that is employed as charge herein can be defined by reference to the following structural formula:

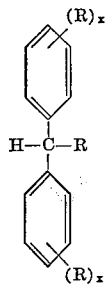

wherein each R is an alkyl substituent, the same or different, having from one to 10 carbon atoms, preferably from one to two carbon atoms, and $x$ is an integer having a value from 1 to 4, preferably from 1 to 2. Examples of such compounds include, 1,1-bis(4-methylphenyl)ethane, 1-(2-methylphenyl), 1 - (4 - methylphenyl)ethane, 1,1-bis (3,4 - dimethylphenyl)ethane, 1,1 - bis(2,4, 6- triethylphenyl)isopentane, 1,1 - bis(2,4,5,6 - tetrahexylphenyl)-octane, 1 - (4 - methylphenyl), 1 - (2,4-dipropylphenyl)-decane, etc. Of these we prefer to employ 1,1-bis(4-methylphenyl)ethane and 1,1-bis(3,4-dimethylphenyl)-ethane.

It is desirable to treat such diaryl alkanes in a manner so that they can be converted to the corresponding nitro benzophenones. This is so because the latter compound can be converted with ease to the corresponding carboxy nitro benzophenones, alkyl amino benzophenones and especially carboxy amino benzophenones. The latter three groups of compounds are commercially attractive, since they can be employed as intermediates in the preparation of high-temperature plastic materials. Unfortunately, nitric acid will not necessarily convert the alkane bridge to a carbonyl bridge and there is a tendency for the alkyl substituents on the ring to be converted to carboxy groups before the addition of nitro groups to the ring. To the extent that carboxy groups are added to the rings, the addition of nitro groups on the ring is inhibited. Furthermore, in order to obtain the desired nitro benzophenones it is critical that the nitric acid be added to the diarylalkane charge, for if the reverse is done, that is, if the diarylalkane is added to the nitric acid, a nitroalkane will be obtained instead of a nitro benzophenone.

Accordingly in the process defined herein the nitric acid is added to the diarylalkane. The nitric acid is preferably fuming nitric acid, although an aqueous solution thereof having a concentration of about 40 to about 100 percent by weight, preferably about 70 to about 95 percent by weight, can be employed. The nitric acid is preferably added to the diarylalkane at a relatively uniform rate. At the beginning of the process the amount of nitric acid added to the diarylalkane is of course small, but by the end of the reaction, for example, from about five to about 50 mols, preferably from about 10 to about 40 mols of nitric acid can be added per mol of diarylalkane. The temperature of the reaction is relatively low, for example, from about −30° to about 120° C., preferably from about 0° to about 50° C. Although the reaction can be carried out at elevated pressures if desired, atmospheric pressure is preferred. The reaction time can be, for example, from about one to about 200 minutes, preferably from about 10 to about 60.

The conversion of the diarylalkane is substantially quantitative. The desired reaction involves oxidation of the alkane bridge on the diarylalkane charge, that is, conversion of the alkane bridge to carbonyl with production of carbon dioxide and water, and substitution of at least one hydrogen on each of the rings with a nitro group.

At the end of the reaction period the desired alkyl nitro benzophenone is recovered from the reaction product in any convenient manner. For example, the reaction product can be poured over ice and the resulting precipitate washed with water until a neutral water wash is obtained. The resulting solid can be crystallized from methanol, ethanol, diethylether, benzene, xylene or their mixtures, preferably xylene or diethylether. The crystalline material obtained represents the product desired herein. In some cases in addition to the desired alkyl nitro benzophenone, some of the alkyl groups thereon are also oxidized and the corresponding carboxy nitro benzophenone is also obtained. This is believed to result after the benzophenone is obtained and the desired nitro groups have been added to the ring, for the nitro groups do not adversely affect the oxidation of the alkyl groups at such time. As pointed out above, such oxidation is not undesirable, for the carboxy nitro benzophenone is a desired end product of the alkyl nitro benzophenones obtained herein. If, however, only the alkyl nitro benzophenone is desired, the mixture can be treated with, for example, about 10 to about 30 percent by weight of sodium hydroxide. The carboxy nitro benzophenone will go into solution as the corresponding salt and the desired alkyl nitro benzophenone can be recovered therefrom, for example, by filtration. To obtain the carboxy nitro benzophenone from the filtrate involves adding an acid, such as hydrochloric acid, to the filtrate in an amount sufficient to precipitate the carboxy nitro benzophenone therefrom. Simple filtration will suffice to recover the carboxy nitro benzophenone.

In the event only carboxy nitro benzophenone is desired, the separation defined above need not be made, and the entire material originally obtained can be subjected to oxidation, using known means and known oxidizing agents, such as nitric acid, potassium permanganate, chromic acid, oxygen, etc., to convert the unreacted alkyl substituents on the ring to carboxy groups. Thus, in a preferred embodiment, the alkyl nitro benzophenone can be treated with aqueous nitric acid having a concentration of about five to about 70 percent, preferably about 20 to about 40 percent, wherein the molar ratio of nitric acid, as 100 percent nitric acid, to the alkyl nitro benzophenone is about 8.0 to about 17.0, preferably about 8.0 to about 12.0, at a temperature of about 110° to about 350° C., preferably about 150° to about 250° C., and a pressure of about atmospheric to about 2000 pounds per square inch gauge, preferably about 100 to about 1000 pounds per square inch gauge, for about one minute to about 48 hours, preferably about 10 minutes to about two hours. The desired carboxy nitro benzophenone precipitates out of solution and can be recovered therefrom by filtration.

If it is desired to convert the latter to the corresponding amino benzophenone, this can be done by any convenient and known means. For example, the carboxy nitro benzophenone can be dissolved in an inert solvent, such as methanol, ethanol, tetrahydrofuran, dioxane, hexane, or mixtures thereof, and the solution can be contacted with hydrogen in at least the amount stoichiometrically sufficient to convert only the nitro groups to the corresponding amino groups in the presence of about five to about 20 percent by weight, based on the carboxy nitro benzophenone, of a hydrogenation catalyst, such as nickel, platinum or palladium, under conditions which can include temperatures in the range of about 50° to about 300° C. and pressures of about 50 to about 2000 pounds per square inch gauge for about 30 to about 240 minutes. The solution is filtered to remove catalyst therefrom and the remainder is subjected to distillation to remove solvent therefrom. The solid reaction product left behind is the desired carboxy amino benzophenone.

In the event an alkyl amino benzophenone is desired the precursor alkyl nitro benzophenone can be subjected to hydrogenation conditions similar to those defined above wherein only the nitro groups are converted to amino groups.

In order further to illustrate the process defined and claimed herein, a series of runs were carried out in which fuming nitric acid (90 percent aqueous nitric acid) was added to 1,1-bis(4-methylphenyl)ethane (DTE) or 1,1-bis(3,4-dimethylphenyl)-ethane (DXE) or DTE was added to fuming nitric acid at atmospheric pressure. The resulting mixture was maintained at a desired temperature level for a defined period of time. The product was then poured over ice and the resulting precipitate washed with water until the wash water was neutral. The resulting solids were crystallized from either xylene or diethylether. Analysis of the solids was made by gas chromatography. In each instance substantially complete conversion of the diarylalkane charge was obtained. The results are tabulated below in Table I.

the respective ring. Note that in Runs Nos. 1 to 6, 12 and 13 the addition of nitric acid to the diarylalkane charge resulted in the corresponding nitro benzophenone, and, depending upon reaction conditions, in the formation of carboxy derivatives and their precursors. Although in Runs Nos. 2 to 6 some nitro alkanes were obtained, the predominant product was composed of the desired nitro benzophenones. In Runs Nos. 7 to 11 the addition of DTE to the nitric acid resulted exclusively in the production of nitro alkanes, with the exception of Run No. 7 wherein, additionally, only a small amount of nitro benzophenone was obtained.

Although we have disclosed and taught above that the procedure is applicable to 1,1-diarylalkanes carrying alkyl substituents on the rings, it is apparent that the procedure herein disclosed and defined also encompses 1,1-diarylalkanes carrying no alkyl substituents on the rings and the claims herein are intended to cover the latter.

Obviously, many modifications and variations of the invention, as hereinabove set forth, can be made without departing from the spirit and scope thereof, and therefore only such limitations should be imposed as are indicated in the appended claims.

We claim:

1. A process for preparing a product predominating in nitro benzophenones from 1,1-diarylalkane which comprises adding from about five to about 50 mols of nitric acid to each mol of said diarylalkane and maintaining the resulting mixture at a reaction temperature of about −30° to about 120° C. for a time sufficient to obtain a product predominating in the corresponding benzophenone carrying at least one nitro group on each of the rings.

2. The process of claim 1 for preparing alkyl nitro benzophenones in which the diarylalkane has the following structural formula:

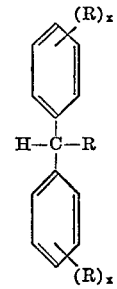

TABLE I

| Run No. | Temp., °C. | Reaction time, minutes | Mode of addition | DTE, gms. | DXE, gms. | HNO₃, gms. | Dinitro-benzo-phenone, grams | 4,4'-dicar-boxy,3,3'-dinitroben-zophenone, grams | 3,4,3',4' tetracar-boxy,5,5' dinitroben-zophenone, grams | Nitro-carboxy precursors of the di-carboxy and tetracar-boxybenzo-phenones, grams | 3,3'-dinitro, DTE | Trinitro and tetra-nitro, DTE |
|---|---|---|---|---|---|---|---|---|---|---|---|---|
| 1 | 95–105 | 180 | HNO₃ to DTE. | 210 | | 2,200 | 240 | 36 | | 33 | | |
| 2 | 70 | 180 | ...do... | 210 | | 1,500 | 240 | 270 | | 15 | | 55 |
| 3 | 40 | 205 | ...do... | 210 | | 1,500 | 270 | | | 10 | | 30 |
| 4 | 50 | 180 | ...do... | 210 | | 1,500 | 260 | | | 15 | | 30 |
| 5 | −15 | 15 | ...do... | 210 | | 1,500 | 280 | | | | | 30 |
| 6 | −20 | 60 | ...do... | 210 | | 1,500 | 285 | | | | | 25 |
| 7 | 55 | 150 | DTE to HNO₃. | 210 | | 1,500 | 15 | | | | 150 | 168 |
| 8 | 0 | 8 | ...do... | 210 | | 1,500 | | | | | 195 | 130 |
| 9 | 0 | 240 | ...do... | 210 | | 1,500 | | | | | 180 | 145 |
| 10 | −20 | 11 | ...do... | 210 | | 1,500 | | | | | 270 | 35 |
| 11 | −20 | 60 | ...do... | 210 | | 1,500 | | | | | 268 | 40 |
| 12 | 60 | 60 | HNO₃ to DXE. | | 238 | 2,200 | 290 | | | 40 | | |
| 13 | 95–105 | 120 | ...do... | | 238 | 2,200 | 30 | | 200 | 150 | | |

The advantages of adding nitric acid to the diarylalkane is apparent from a consideration of the data in the above table. The column "Dinitro benzophenone, grams" refers to 4,4'-dimethyl-3,3-dinitrobenzophenone when DTE is the charge and 3,3',4,4'-tetramethyl, 5,5-dinitro benzophenone when DXE is the charge. In the latter some of the nitro groups may be in various available positions on the respective ring. wherein R is an alkyl substituent having from one to 10 carbon atoms and x is an integer having a value of 1 to 4.

3. The process of claim 1 wherein the diarylalkane is 1,1-bis(4-methylphenyl)ethane.

4. The process of claim 1 wherein the diarylalkane is 1,1-bis(3,4-dimethylphenyl)ethane.

5. The process of claim 1 wherein the diarylalkane is 1,1-bis(4-methylphenyl)ethane, wherein said reaction temperature is about 0° to about 50° C.

6. The process of claim 1 wherein the diarylalkane is 1,1-bis(3,4-dimethylphenyl)ethane, wherein said reaction temperature is about —0° to about 50° C.

7. The process of claim 1 wherein the diarylalkane is 1,1-bis(4-methylphenyl)ethane and subjecting the alkyl nitro benzophenone obtained to oxidation with nitric acid to convert said alkyl groups to carboxy groups.

8. The process of claim 1 wherein the diarylalkane is 1,1-bis(3,4-dimethylphenyl)ethane and subjecting the alkyl nitro benzophenone obtained to oxidation with nitric acid to convert said alkyl groups to carboxy groups.

References Cited
UNITED STATES PATENTS

| | | | |
|---|---|---|---|
| 2,565,300 | 8/1951 | Faith et al. | 260—517 |
| 3,014,908 | 12/1961 | Coleman et al. | 260—517 |
| 3,120,564 | 2/1964 | Milionis et al. | 260—517 |
| 3,479,400 | 11/1969 | Lese et al. | 260—517 |

FOREIGN PATENTS

| | | | |
|---|---|---|---|
| 277,285 | 3/1928 | Great Britain | 260—517 |
| 713,812 | 5/1952 | Great Britain | 260—517 |

JAMES A. PATTEN, Primary Examiner

U.S. Cl. X.R.

260—591, 649 D

PO-1050
(5/69)

UNITED STATES PATENT OFFICE
CERTIFICATE OF CORRECTION

Patent No. 3,641,132      Dated February 8, 1972

Inventor(s) Johann G. D. Schulz and Richard Seekircher

It is certified that error appears in the above-identified patent and that said Letters Patent are hereby corrected as shown below:

Column 3, line 72, "4,4'-dimethyl-3,3-dinitrobenzophenone" should read "4,4'-dimethyl-3,3'-dinitrobenzophenone".

Signed and sealed this 6th day of June 1972.

(SEAL)
Attest:

EDWARD M. FLETCHER, JR.
Attesting Officer

ROBERT GOTTSCHALK
Commissioner of Patents